INVENTORS:
C. R. HILPERT
J. B. BLACK

BY: James E. Nilles
ATTORNEY

INVENTORS:
C. R. HILPERT
J. B. BLACK

BY: James E. Nilles
ATTORNEY

United States Patent Office 3,420,344
Patented Jan. 7, 1969

3,420,344
SELF-STABILIZING POWER TRANSMITTING DEVICE HAVING HYDRAULICALLY ACTUATED FRICTION PLATES AND TORQUE RESPONSIVE HYDRAULIC INVERSE FEEDBACK
Conrad R. Hilpert, Winnebago, and James B. Black, Roscoe, Ill., assignors to Twin Disc, Incorporated, Racine, Wis., a corporation of Wisconsin
Filed Mar. 22, 1967, Ser. No. 625,144
U.S. Cl. 192—56          9 Claims
Int. Cl. F16d 7/02; F16d 43/20

ABSTRACT OF THE DISCLOSURE

Power transmitting devices, such as clutches or brakes including disengageable friction plates, which utilize torque responsive hydraulic means to provide inverse feedback pressure to insure a constant output torque.

Background of the invention

This invention pertains to hydraulically actuated friction devices, such as clutches or brakes, which have hydraulic means for sensing the torque between the drive and driven members of a power transmitting mechanism, and which means creates a pressure which counterbalances the clutch apply pressure to insure a constant output torque to the mechanism.

In prior art devices of this general character, the coefficient of friction of the clutch surfaces changes considerably during operation of the device, and as a result the load may be subjected to a different torque than originally intended or desired.

The co-pending U.S. application Ser. No. 609,457, filed Jan. 16, 1967, entitled "Power Transmitting Device Having Hydraulically Actuated Friction Plates and Torque Sensing Means," discloses hydraulic means for sensing the torque between the drive and driven members and consequently causing variable clamp up of the friction plates to maintain constant output torque, regardless of coefficient of friction changes.

Summary of the invention

The present invention relates to a power transmitting device of the above type, namely, one having hydraulically actuated friction plates capable of being variably clamped, and having hydraulic means for measuring the delivered torque and accordingly varying the clamp up force and thereby maintain the output torque constant. This is accomplished by providing a degenerative means in the form of fluid pressure which is a linear function of the torque transmitted due to the clutch apply pressure, and which degenerative fluid pressure is used to oppose the clutch apply pressure. As a result, the variations in clutch engagement which are due to the varying coefficient of friction in the clutch plates while they are being or are in engagement, become insignificant and the clutch responds accordingly.

The present clutch responds to the degenerative equation:

$$T = \frac{Cu}{1 + Bu}$$

where T is the transmitted torque, C and B are constants determined by the dimensions of the clutch cylinders, and $u$ is the coefficient of friction. As the coefficient of friction value $u$ appears in both the numerator and denominator of this torque equation, it becomes insignificant, i.e., it substantially cancels itself out. As the value of B gets larger, the dependence on the coefficient of friction in the operation of the clutch becomes less. Thus a control system for the torque is provided which functions as independently as desired of the changes in the coefficient of friction.

Another aspect relates to such a device in which the friction plate apply pressure is separate from the control pressure and as a result, the transmitted torque will be a function of the control pressure and readily adjustable.

Still another aspect relates to clutches of the above type which can transmit torque in either direction of rotation.

These and other objects and advantages of the present invention will appear as this disclosure progresses.

Description of the preferred embodiments

Figure 1:
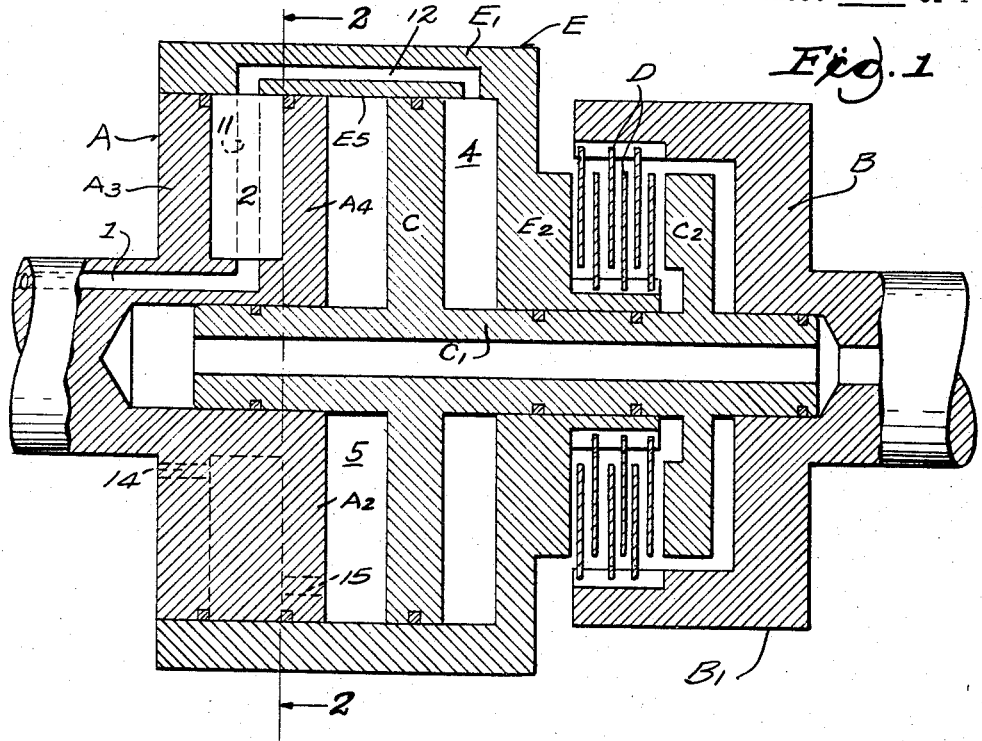
FIGURE 1 is a longitudinal, cross sectional view of a power transmitting device embodying the present invention, and illustrating a single pressure system.

The drawings are schematic in character and the devices would, in practice, be fabricated from different, separate parts to facilitate manufacture and assembly rather than being made integral as shown. Furthermore, suitable oil seals and bearings of conventional nature are provided, some of which have only been indicated schematically and not referred to otherwise. In addition, conventional passages would be provided for distribution of cooling medium, such as oil, to the interleaved friction plates.

Reference letters A and B refer to the drive and driven members of the power transmitting device, and either one can be considered the drive or driven member, that is, power can flow through the device in either direction, unless indicated otherwise. By drive member is meant it is the input member, that is, power is put into the device through the input or drive member. By driven member is meant it is the power output member.

In general reference to the drawings, a fluid pressure medium, such as oil, is provided from a conventional pressure source or sources, having conventional control valves, which are not believed necessary to illustrate herein, it being sufficient to state that the pressure fluid is introduced into the device via conventional rifle drilling or other passages, as indicated.

The interleaved friction plates D shown in the various figures are alternately splined to their associated members in conventional manner and are axially slidable within limits so as to be capable of being clamped up tightly to transmit full torque, or clamped with a variable force to thereby transmit a proportional portion of the power, as is known. Complete release of the clamp-up pressure causes disengagement of the drive connection, conventional springs (not shown) sometimes being used to insure clean release.

The clutches shown may be arranged in duplex fashion, for example as in the U.S. patent to Snoy et al., No. 3,243,026, issued Mar. 29, 1966, but for the sake of clarity of the disclosure, reference will be made to single power transmitting devices.

Reference may be made herein to a clutch in which the invention finds considerable utility, but it will be appreciated by those skilled in this art that the invention is equally applicable where one member may be fixed, as in a brake.

Power from a source (not shown) may be applied to the member A which is fabricated to define diametrically opposed, portions A1 and A2, and also has ends flanges A3 and A4. Pressure fluid is supplied for controlling the clutch apply pressure via passage 1 in member A which terminates in the expansible transducing chambers 2 and 2' (FIGURE 2), to be referred to momentarily.

Member E is a sensing or carrier member and serves to carry some of the friction plates, as previously described, and can bear in abutting, clamp-up relationship to the plates. It is shown for illustrating the invention as being formed as a generally annular housing having an outer cylindrical portion E1, a plate carrying and abutting flange E2, and diametrically spaced, inwardly extending portions E3 and E4.

Thus, members A and E form four expansible chambers 2, 2', 7 and 7' between them, into and from which fluid is introduced as will appear. It will also be assumed that different numbers of chambers and vanes may be employed.

A piston C, slidable by its central stem C1 in complementary central bores in members A, E and B, is enclosed by and in sliding sealing engagement with the internal cylindrical surface E5 of member E. Piston C has a friction plate back-up plate or radial flange C2 which can abut against one end of plates D, opposite to flange E2.

Member B has some of the plates D splined thereto, as previously mentioned, and is shown as having a cylindrical portion B1 which surrounds plates D and back-up flange C2.

Figure 2:
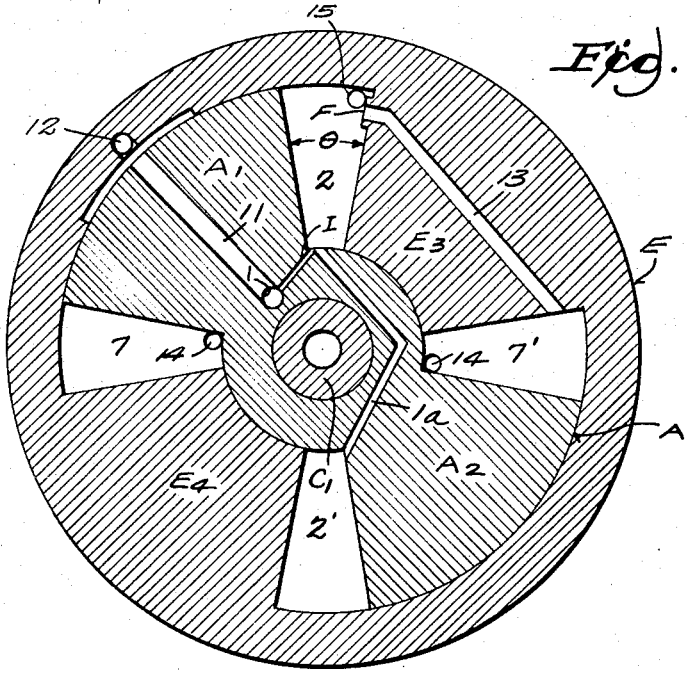
FIGURE 2 is a cross sectional view taken generally along line 2—2 in FIGURE 1.

FIGURES 1 and 2

Fluid supply passage 1 is in fluid communication with chamber 2 via orifice I which in turn communicates with chamber 2' via passage 1a formed in member A. Control pressure also flows from passage 1 through passage 11 in member A, passage 12 in member E and to the clutch apply chamber 4, and causes the clutch plates to engage, thus developing torque.

Orifice I in member A permits fluid flow to chambers 2 and 2' where it then flows via valve F, passage 13 in member E and to chamber 7'. Chambers 7 and 7' are vented via passage 14, to the cooling system, for example. Thus chambers 7 and 7' are centrifugal balance chambers which are vented directly to sump.

Passage 15 is so located in member A that it always connects chambers 2 and 2' to the balance chamber 5.

Torque which is developed causes angle θ to decrease, because no opposing pressure can be built up in chambers 2 and 2' until the radial wall of member A begins to close valve F. Then the pressure rises in chambers 2 and 2' to a value where it equals the torque between the members and if it exceeds it, the valve F opens. This pressure rise in chambers 2 and 2' causes a corresponding rise in chamber 5 which then opposes the apply pressure in actuating chamber 4. When valve F is closed, the pressure in passage 1 also is present in chambers 4 and 5, therefore the clutch is not engaged because the pressure in chamber 5 balances the pressure in chamber 4, and the clutch transmits no torque. The valve F constitutes valve means for regulating the fluid pressure in the balance chamber 5.

Thus the pressure of the fluid in chambers 2 and 2' is an exact linear function of torque and it is conducted via passage 15 to chamber 5 where it opposes the apply pressure in chamber 4.

Chambers 2 and 2' are thus what may be termed transducing chambers in that they serve to measure the torque, that is, they develop a pressure which is equal to the torque being transmitted and feed this proportional pressure back so that it acts in opposition to the clutch apply pressure.

Figure 3:
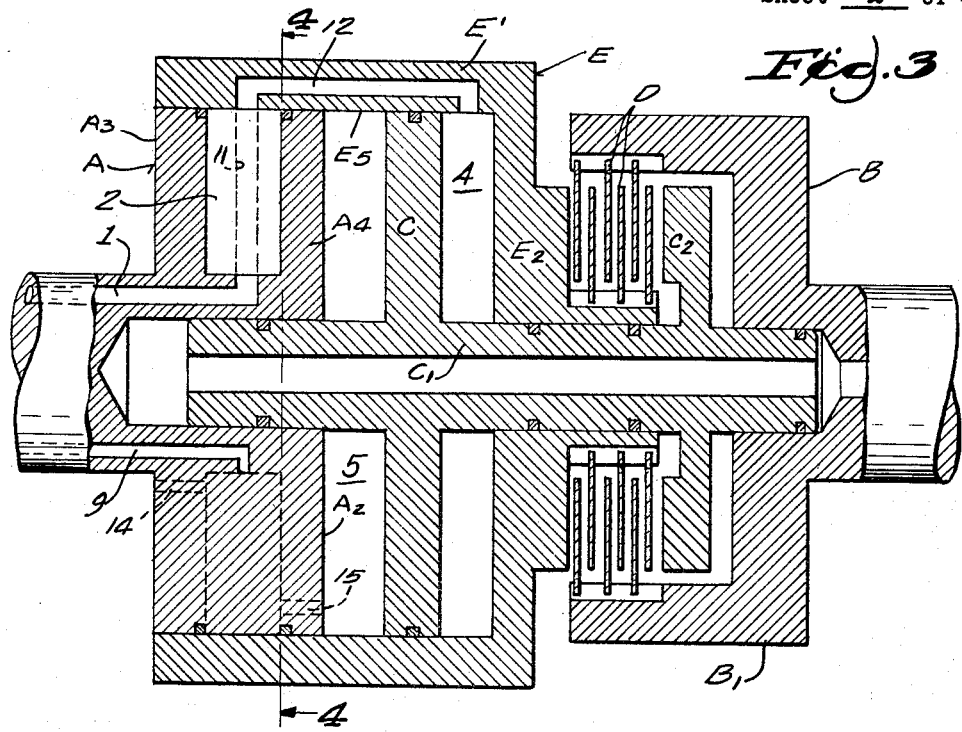
FIGURE 3 is a view similar to FIGURE 1, but illustrating a two pressure system, that is, having separate control and apply pressure.
Figure 4:
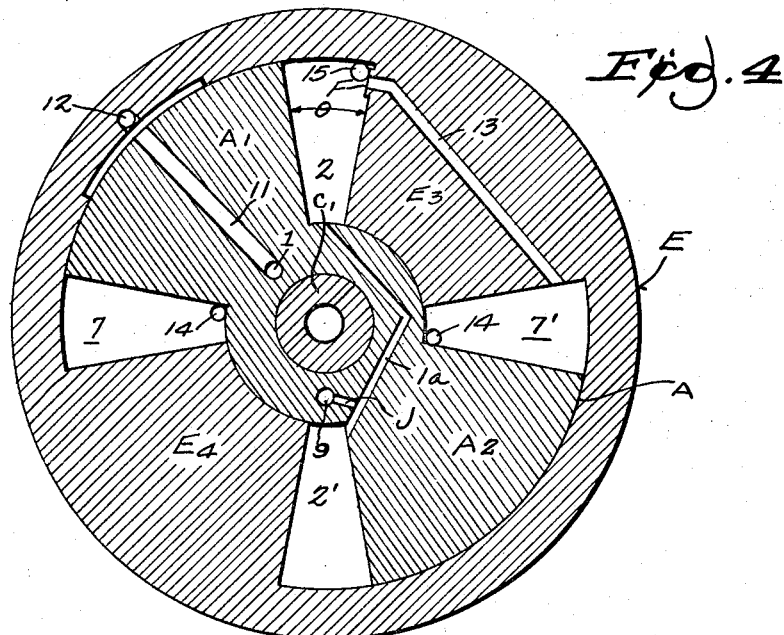
FIGURE 4 is a cross sectional view taken generally along line 4—4 in FIGURE 3.

FIGURES 3 and 4

The device shown in these figures illustrate the use of the present invention in a two pressure system, that is, where the pressure used to apply clamp-up force to the plates is separate from the pressure fluid used to sense or control the torque. Here the clutch feed back pressure could be greater than the control pressure as fluid is supplied from a continuous, high pressure, external source.

The arrangement in FIGURES 3 and 4 is somewhat similar to that in FIGURES 1 and 2 except that high pressure fluid is continuously introduced via a separate passage 9 in member A and flows to chambers 2 and 2' via orifice J in member A. Pressure is built up in chambers 2 and 2', as described for FIGURES 1 and 2, and again is limited only by the high pressure applied by passage 9 and the torque developed, and is not dependent on the apply pressure in passage 1.

General

The clutch above described responds to the equation previously referred to, namely:

$$T = \frac{Cu}{1+Bu}$$

where C and B are constants determined by the dimensions of the clutch cylinders and $u$ is the coefficient of friction. More specifically, these C and B values of the equation are derived as follows:

In equations $$C = NR_F P_A A_A$$

and in equation $$B = \frac{NA_R R_F}{R_D A_D}$$

N = number of friction interfaces
$R_F$ = mean radius of plates
$P_A$ = apply piston pressure
$A_A$ = apply piston area
$A_R$ = release piston area
$R_D$ = mean radius of rotary cylinder vanes
$A_D$ = area of rotary cylinder vanes It can now be seen that in the torque formula, the value of the coefficient of friction $u$ becomes of minor consequence, as the value of B becomes greater, and the clutch functions as independently as desired of changes in the coefficient of friction.

In the operation of the above described clutch, when the clutch is applied and there is no torque transmitted, there is then the full application of force acting in chamber 4 to clamp up the friction plates.

Chambers 2 and 2' are transducing chambers in that they measure the torque, that is to say, they develop a pressure which is a linear function of the torque being transmitted.

When torque is placed on the device, some of the pressure developed by that torque is fed back to chamber 5 and opposes the clutch apply pressure. The greater the amount of torque developed, the greater will be the counterbalancing pressure.

Theoretically, if sufficient torque were developed, the clutch could be completely released by this counterbalancing, but of course in practice if the clutch is released, then there is no torque.

FIGURES 5 to 8

The devices shown in these figures illustrate the invention used for controlling and carrying torque in either direction of rotation, that is, a left or right hand torque. To obtain this bidirectional control, additional valving is provided which functions to reverse the connections between the fluid pressure input and output. This additional valving accomplishes this reversing of the circuit automatically as the torque changes its direction, or sense.

In FIGURES 1 and 2, both clutch apply and control torque are furnished through passage 1.

If torque is applied in such a rotational direction so that angle Θ decreases, fluid from passage 1 goes through orifice 25 in member A and is applied directly into chambers 2 and 2'. Chambers 7 and 7' will be open to the sump via passage 23 in member A.

No pressure will be developed in chambers 2 and 2' to oppose this torque until the vent to the sump via passage 23 begins to be closed off in chamber 2. The pressure in chambers 2 and 2' will be a function of torque providing the pressure in passage 1 is of sufficient magnitude.

Here the additional valving is between the control pressure and sump and the torque sensing chambers. In one torque direction, the chambers 2 and 2' are the sensing chambers and chambers 7 and 7' are the balance chambers. In the other torque direction, the chambers 7 and 7' are the sensing chambers and chambers 2 and 2' are the balance chambers.

If the torque is applied in such a rotational direction so as to cause angle Θ to increase, then fluid pressure from passage 1 and via orifice 25 will be applied to chambers 7 and 7'. Both chambers 2 and 7 are open to sump simultaneously while the porting connecting 24 to chambers 2 and 7 are closed simultaneously.

Fluid pressure from passage 1 travels to apply chamber 4 to engage the clutch and passage 24 conducts fluid pressure from the torque sensing chamber to chamber 5 to thereby oppose the fluid pressure in chamber 4.

As in the FIGURES 1 and 2 device, the negative feed back is provided by pressure in chamber 5 tending to release the clutch is a function of the torque.

Figure 5:
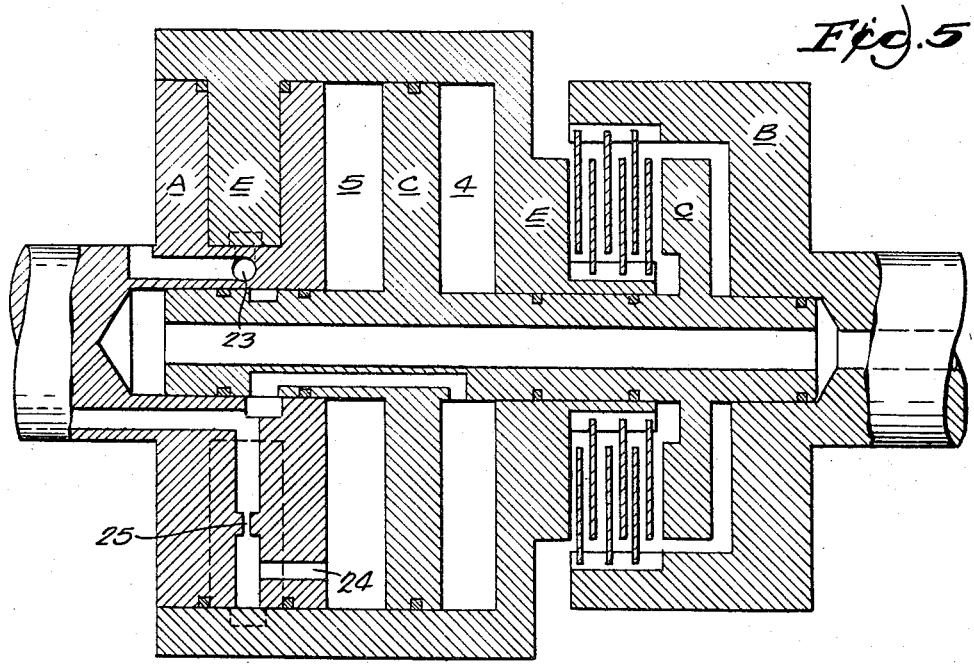
FIGURES 5 and 6 are similar to FIGURES 1 and 2 in that they show a single passage for both apply pressure and control pressure, but illustrating a modification for bidirectional control.
Figure 6:
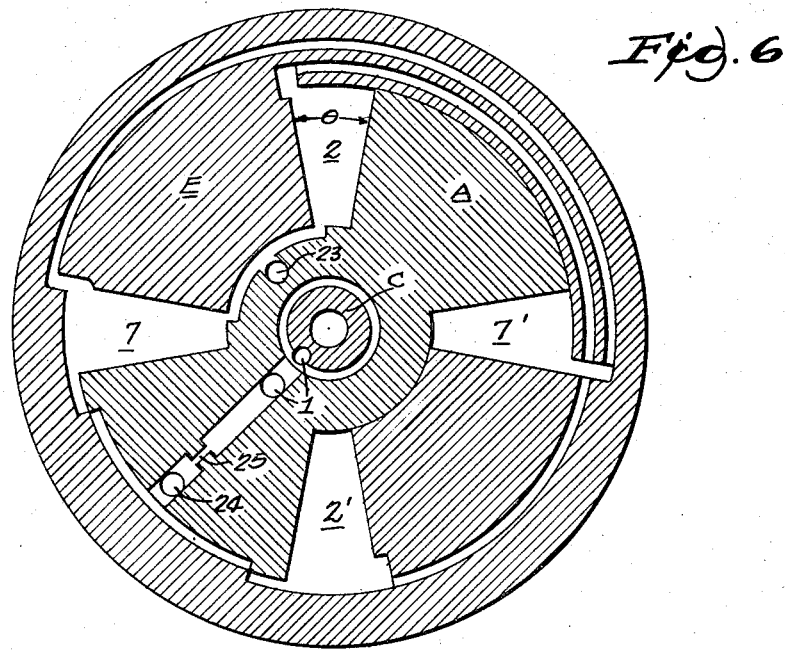
Figure 7:
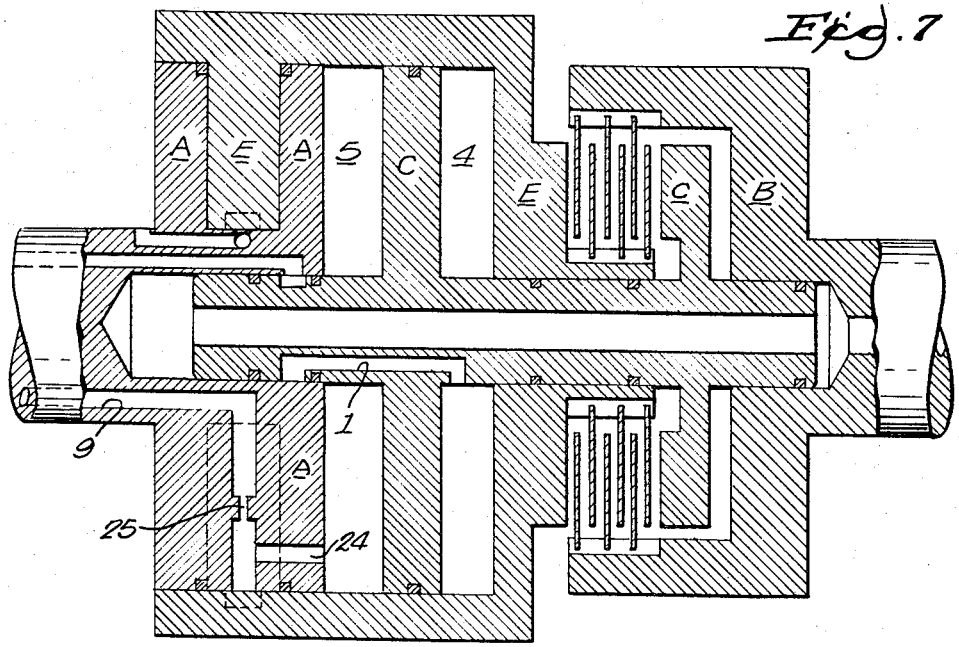
FIGURES 7 and 8 are similar to FIGURES 3 and 4 in showing apply pressure being separate from the control pressure, but illustrating a modification for bidirectional control.
Figure 8:
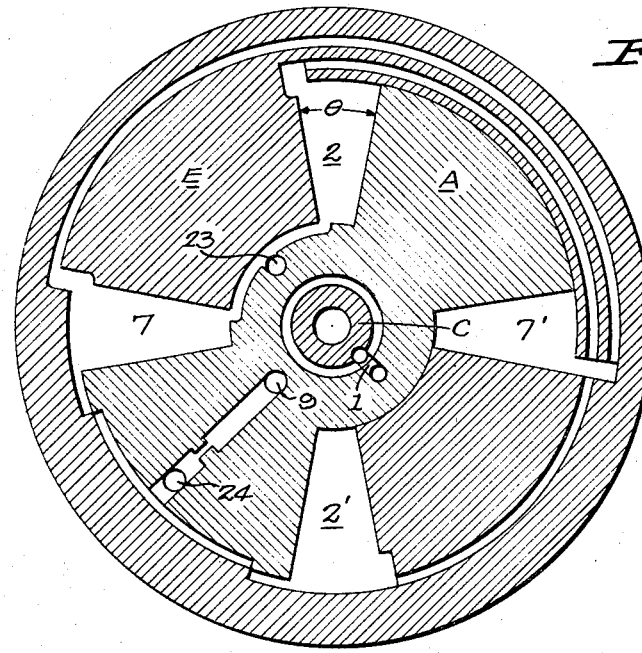

FIGURES 7 and 8 are modifications of the single pressure FIGURES 5 and 6 device, and illustrate how the control pressure applied at chamber 4 can be made independent of the pressure fluid which supplies the source for the negative feed-back pressure at chamber 5. A separate high pressure fluid is supplied via passage 9. Control fluid pressure at passage 1 is always delivered directly to chamber 4, thus applying the clutch. This causes the valving, previously referred to, to develop a fluid pressure in chamber 5 which is in opposition to that in chamber 4. However, this pressure is not dependent on the control pressure in passage 1 because it is supplied via orifice 25 from the constant source of high pressure applied through passage 9.

Thus, after the fluid pressure has passed through the orifice in passage 9, the additional valving acts to provide reversing of the high pressure so that either chambers 2 and 2' are the sensing chambers while chambers 7 and 7' are the balance chambers, or vice versa.

We claim:

1. A power transmitting device of the type having a drive and a driven member, hydraulically actuated and interleaved friction plates, and hydraulic clutch apply means including an expansible fluid pressure apply chamber for varying the degree of engagement of said plates, the improvement comprising, hydraulically actuated means between said drive and drive members including a measuring chamber for measuring the torque therebetween; said hydraulically actuated means including an expansible balance chamber having passage means in communication with said measuring chamber for pressurizing said balance chamber and thereby opposing apply pressure in said apply chamber, and valve means for regulating the fluid pressure in the measuring chamber and the balancing chamber in accordance with the torque measured to thereby vary the degree of friction plate clamp and consequently provide constant output torque.

2. A device as defined in claim 1 including a separate fluid passage means to said hydraulically actuated means.

3. A hydraulically actuated power transmitting device having input and output members, a carrier rotatably mounted on one of said members and defining torque measuring means including a fluid chamber therebetween for measuring torque by relative rotation therebetween, interleaved friction plates between the other member and said carrier and forming a disengageable friction plate connection therebetween, an axially shiftable and hydraulically actuated piston mounted for axial shifting relative to said carrier and abuttable against said plates to cause clamp-up of said plates; said piston and carrier defining an expansible fluid, friction plate actuating chamber, passage means for supplying pressure fluid to said actuating chamber to cause expansion thereof and consequent axial shifting of said piston and clamp-up of said plates, said piston and carrier also defining a balance chamber, said torque measuring means including valve means actuated by rotational shifting of said carrier relative to said one member to regulate flow of pressure fluid to said balance chamber which acts to counterbalance the pressure fluid in said actuating chamber.

4. A device as defined in claim 3 further characterized in that a single pressure fluid supply is provided for both said torque measuring chamber and said actuating chamber.

5. A device as defined in claim 3 further characterized in that a separate fluid supply passage is provided for each of the torque measuring fluid chamber and said actuating chamber whereby the torque output of said device can be independently varied by varying the fluid pressure in said torque measuring fluid chamber.

6. A device as defined in claim 1 including additional valving means connected to said hydraulically actuated means for reversing the fluid flow between the fluid input and fluid output of said hydraulically actuated means.

7. A device as defined in claim 2 including additional valving means connected to said hydraulically actuated means for reversing the fluid flow between the fluid input and fluid output of said hydraulically actuated means.

8. A device as defined in claim 3 including additional valving for said torque measuring chamber for reversing the direction of flow of fluid therethrough.

9. A device as defined in claim 5 including additional valving for said torque measuring chamber for reversing the direction of flow of fluid therethrough.

References Cited

UNITED STATES PATENTS

| 2,277,554 | 3/1942 | McCoy. |
| 2,521,117 | 9/1950 | Dubois et al. |
| 2,642,971 | 6/1953 | Hagenbook. |
| 2,783,628 | 3/1957 | Hallewell. |
| 3,182,777 | 5/1965 | Browning et al. |

BENJAMIN W. WYCHE III, *Primary Examiner.*

U.S. Cl. X.R.

192—85, 55